(12) United States Patent
Abbott (10) Patent No.: US 8,306,408 B2
(45) Date of Patent: Nov. 6, 2012

(54) RADIANT HEATING USING HEATER COATINGS

(75) Inventor: Richard C. Abbott, New Boston, NH (US)

(73) Assignee: Thermoceramix Inc., Boucherville (CA)

( * ) Notice: Subject to any disclaimer, the term of this patent is extended or adjusted under 35 U.S.C. 154(b) by 1070 days.

(21) Appl. No.: 12/156,438

(22) Filed: May 30, 2008

(65) Prior Publication Data

US 2009/0297132 A1 Dec. 3, 2009

(51) Int. Cl.
*A45D 20/40* (2006.01)
*H05B 1/00* (2006.01)

(52) U.S. Cl. ......................................... 392/407; 219/213

(58) Field of Classification Search .................. 392/407, 392/408–440; 219/213
See application file for complete search history.

(56) References Cited

U.S. PATENT DOCUMENTS

| | | | |
|---|---|---|---|
| 2,521,540 A | 9/1950 | Richardson | |
| 2,799,764 A | 7/1957 | Chandler | |
| 2,889,439 A | 6/1959 | Musgrave | |
| 2,932,711 A * | 4/1960 | Adams | .......................... 392/435 |
| 3,277,419 A | 10/1966 | Butz | |
| 3,564,200 A | 2/1971 | Governale et al. | |
| 3,657,516 A | 4/1972 | Fujihara | |
| 3,686,472 A | 8/1972 | Harris | |
| 3,697,728 A | 10/1972 | Stirzenbecher | |
| 3,767,895 A | 10/1973 | Needham | |
| 3,973,103 A | 8/1976 | Tadewald | |
| 4,032,751 A | 6/1977 | Youtsey et al. | |
| 4,071,737 A | 1/1978 | Marshall et al. | |
| 4,310,745 A | 1/1982 | Bender | |
| 4,469,936 A | 9/1984 | Hunter | |
| 4,485,297 A | 11/1984 | Grise et al. | |
| 4,616,125 A | 10/1986 | Oppitz | |
| 4,713,530 A | 12/1987 | Schittenhelm et al. | |
| 4,860,434 A | 8/1989 | Louison et al. | |
| 4,868,899 A | 9/1989 | Bard et al. | |
| 5,138,134 A | 8/1992 | Ellison | |
| 5,380,988 A | 1/1995 | Dyer | |
| 5,408,069 A | 4/1995 | Mischel, Jr. | |
| 5,624,591 A | 4/1997 | DiTrapani | |
| 5,888,429 A | 3/1999 | Lovell | |
| 5,910,267 A | 6/1999 | Stricker | |
| 5,961,869 A | 10/1999 | Irgens | |
| 6,080,974 A | 6/2000 | Ambrosiano et al. | |
| 6,101,776 A * | 8/2000 | Conley | ............................ 52/379 |

(Continued)

FOREIGN PATENT DOCUMENTS

GB      2206770      1/1969

(Continued)

*Primary Examiner* — Daniel L Robinson
(74) *Attorney, Agent, or Firm* — BCF LLP (57) ABSTRACT

A radiant heating system comprises a thermally sprayed resistive heating layer bonded to an underlayment building material substrate. The substrate can comprise a sub-flooring material and the heating system can comprise a radiant floor heating system. The resistive heating layer can be thermally sprayed directly onto a sub-floor or similar underlayment material, including a cementitious backing material or a sound reduction board. A finished floor surface, such as a tile, wood or laminate surface, can be provided over the substrate and thermally sprayed heater to provide a radiant floor heater. In other embodiments, a radiant heating system includes a thermally sprayed heater bonded to a flooring overlay, such as a laminate board, to a heater insert, such as a flexible polymer film or a mica-based material, or to a concrete substrate. Methods of fabricating radiant heating systems include thermally-spraying a resistive material on a sub-floor or flooring overlay.

15 Claims, 8 Drawing Sheets

U.S. PATENT DOCUMENTS

| | | |
|---|---|---|
| 6,154,607 A | 11/2000 | Flashinski et al. |
| 6,184,496 B1 * | 2/2001 | Pearce ........................... 219/213 |
| 6,556,779 B1 | 4/2003 | Stabile et al. |
| 6,736,997 B2 | 5/2004 | Olding et al. |
| 6,737,611 B2 | 5/2004 | Ek et al. |
| 6,762,396 B2 | 7/2004 | Abbott et al. |
| 6,917,753 B2 | 7/2005 | Cooper |
| 6,919,543 B2 | 7/2005 | Abbott et al. |
| 7,039,304 B2 | 5/2006 | Gerhardinger et al. |
| 7,132,628 B2 | 11/2006 | Ptasienski et al. |
| 7,265,323 B2 | 9/2007 | Gerhardinger et al. |
| 7,361,869 B2 | 4/2008 | Russegger |
| 2003/0121906 A1 | 7/2003 | Abbott et al. |
| 2004/0149733 A1 | 8/2004 | Abbott et al. |
| 2004/0188418 A1 | 9/2004 | Aisenbrey |
| 2005/0225128 A1 * | 10/2005 | Diemer et al. ........... 297/180.12 |
| 2006/0065654 A1 | 3/2006 | Ptasienski |
| 2007/0278213 A2 | 12/2007 | McMillin et al. |
| 2008/0056694 A1 | 3/2008 | Cooper |
| 2008/0083740 A1 | 4/2008 | Kaiserman et al. |
| 2008/0217324 A1 | 9/2008 | Abbott |

FOREIGN PATENT DOCUMENTS

| | | |
|---|---|---|
| WO | WO 98/51127 | 11/1998 |

* cited by examiner

RADIANT HEATING USING HEATER COATINGS

BACKGROUND OF THE INVENTION

Radiant heat derives from electromagnetic radiation that emanates from matter, or more specifically from the atoms that make up the matter. The atoms are electrically charged with the charge distributed over its volume such that on average an associated tiny electrical field called a dipole exists. Since all atoms in matter vibrate, the dipoles associated with the atoms also vibrate, and thus emanate an electromagnetic field. The frequency of the emanated field is equal to the atom's frequency of vibration, which we characterize as its temperature. Thus, radiant energy from all matter is proportional to its temperature, and all matter with a temperature above absolute zero radiates.

Atoms not only radiate electromagnetic radiation, they also absorb it. This is because atomic charge responds to a superimposed electric field. Therefore, atoms that experience an electromagnetic field with a higher frequency will begin to vibrate at that frequency and therefore manifest a higher temperature. Moreover, since radiation is quickly attenuated inside a given material, almost all the emission, reflection and absorption of radiation occurs at the surface of the material. Thus, a given system, such as a room containing furniture and humans, will include matter of various densities, compositions and temperatures all radiating and absorbing electromagnetic temperature proportional to its temperature.

All electromagnetic radiation travels at the speed of light and generally in straight lines. Therefore, the mathematical characterization of radiant heat accounts for its proportionality to the temperature of the radiating body, the emissive, reflective or absorptive nature of the body's surface, and the geometry of the areas that are "in sight" of each other. This last term is known as the "view factor." The relationship between the flux of radiant heat and these factors is linear except for temperature, where it proportional to the fourth power ($T^4$).

Rooms are often heated by heating the air that they contain. The air can be heated at a remote furnace, e.g., in the basement, and blown or forced into the room, or the air can be heated by hot water that is piped to a "radiator." Alternatively, an electric heating element can be energized and air can be caused to flow past the element. The air may flow past these devices either naturally (convective heat transfer) or by being forced by a blower or fan. Therefore, humans feel warmth by feeling the warm air next to their skin and clothing. Of course, the heating of a room is always a combination of convective, conductive and radiative heat transfer so that when one refers to a room's heating mode, it is generally with reference to the predominant heating mode. For example, if the room contains a window, there may be a strong radiative heat transfer component from the sun that constitutes the predominant heating mode during a sunny day.

Rooms can also be heated with a predominant, engineered radiant heat transfer component at all times. Radiant heating systems are characterized by large areas from which heated surfaces radiate and lower temperatures. Rooms can also be heated with engineered radiant heating systems as an added comfort factor. For example, a bathroom may have a forced hot air system for heating the air together with a radiant heated floor to heat bare feet and add a measure of "comfort." Radiant heating uses the electromagnetic property of materials described above to radiate energy for absorption by human skin and clothing. It is therefore sometimes referred to as "direct heating," or as "heating the people and not the air."

Moreover, radiant heating can utilize all surfaces in a room because the air in the room is not the predominant absorber of the heat. When air is used to carry heat, there is a tendency for the warmer air, which is less dense, to buoy up to the ceiling where it cannot heat people. However, with radiant heat, the air is heated less and better absorbers, e.g., humans, are heated more. Therefore, one can utilize ceilings, floors, walls and room dividers as surfaces for heat radiation.

In a room heated by radiant heat, there is a heat source located at or below the radiating surface. When the heat energy reaches the radiating surface, e.g., the floor, the air at the surface is heated and rises as cooler air sinks to displace it. However, much of the energy is radiated from the surface to all objects within view that are cooler depending on the emissive properties of the floor material. Clearly, it is advantageous to choose a surface material with high emissivity such as tile rather than one of low emissivity such as carpet, and it is more energy efficient to choose surface treatments for other surfaces such as walls to have covering that have low absorption.

There are two common types of radiant heating systems: hydronic and electric. Hydronic systems consist of water pipes made of either copper or plastic that are placed on a subfloor and under the floor surface. The space between the pipes is sometimes filled with a cementitious material, e.g., gypsum, to improve the thermal conductivity between pipes and floor. Usually, hot water is generated at a source such as a water heater located in a basement and pumped to the piping system under the floor. Hydronic systems are inefficient and complicated because frequently multiple fluid circuits are necessary for one floor since the water becomes too cold to uniformly heat a given floor in a single pass. Hydronic systems often are complex to install because they consist of many valves, manifolds, pumps and fluid controls.

Electric systems typically utilize wires that are laid out on a sub floor, and then covered with the working floor surface. Often, the wires are thin enough such that the cement used to attach the tiles is sufficient to support and protect them. Heat transfer is a problem with electric wire systems because all the heat energy that is ultimately absorbed by humans in the room must be generated along a thin wire. From the wire, the heat must conduct through its sheath, up to the floor, and then laterally across the floor surface if uniform heating is desired. Since a temperature gradient is the driving force for conduction, the wires must operate at high temperature to flow the heat properly to the upper floor surface. Stated another way, the tiny wire surface must generate a very high power density (in watts/$in^2$) in order to achieve even a small energy density (such as 12 watts/$ft^2$) at the floor surface.

A less common electric radiant heating system is the STEP Warmfloor™ system from Electro Plastics, Inc. of St. Louis, Mo. This system utilizes a carbon resistor encapsulated in polymer film that serves as an underlayerment for tiles, carpet and other floor coverings. A similar system is described in U.S. Pat. No. 6,737,611 to Ek et al. These systems exhibits improved efficiency over wire-based heaters, but they have not been widely used due to the high cost of the materials and the difficulties in installing and using these systems for certain applications, such as in non-rectangular and/or irregularly-shaped floors.

SUMMARY OF THE INVENTION

In a preffered embodiment of the invention, a radiant heating system comprises a thermally sprayed resistive heating layer on an underlayment building material substrate. In certain embodiments, the substrate can comprise a sub-flooring material and the heating system can comprise a radiant floor heating system. The resistive heating layer can be thermally sprayed directly onto a sub-floor or similar underlayment material, including a cementitious material such as gypsum- and/or cement-based backing substrate. The heating layer can be thermally sprayed on any suitable underlayment substrate, such as a sound reduction board. A finished floor surface, such as a tile, wood or laminate surface, can be provided over the substrate and thermally sprayed heater to provide a radiant floor heater.

A thermal spray coating process can be used to deposit coatings that behave as heaters when electrically energized. In a preferred method for fabricating a heating element using thermal spray, a material in powder or wire form is melted and formed into a flux of droplets that are accelerated by means of a carrier gas towards the surface to be coated. The droplets impact the surface at high speed, sometimes supersonic speed, and very quickly solidify into flat platelets. By traversing the spray apparatus over the surface, a substantially lamellar coating comprising these solidified platelets is formed.

In certain aspects, the bulk resistivity and thus the heat generating capability of the heater element can be raised by providing resistive heating layer composed of an electrically conductive material and an electrically insulating material, where the electrically insulating material has a higher electrical resistance than the electrically conductive material. In certain embodiments, the material resistivity of the thermally sprayed heating layer is greater than about $10^{-4}$ Ω-cm.

In some embodiments of the invention, a bonding layer can be applied to the underlayment substrate to provide a superior adhesive surface for the thermally sprayed resistive heating layer. The bonding layer can be roughened, such as by grit blasting, to improve adhesion by the resistive heating layer. Various additional layers, such as a moisture barrier and ground plane, can be provided over the heating layer for protection and safety purposes.

The resistive heating layer can be formed into a desired circuit pattern using any suitable technique, such as masking, mechanical or laser cutting, or microabrasion. Suitable electrical connectors or terminals are added to connect a voltage across the circuit and generate heat. The connectors are preferably configured to allow easy interconnection to adjacent heaters and/or to a power source.

In other embodiments, a radiant heating system comprises a thermally sprayed resistive heating layer on or under a flooring overlay material, such as a laminate flooring board. The resistive heating layer can be thermally sprayed directly onto a surface of the laminate flooring board. In certain embodiments, the heating layer can be bonded to the underside of the flooring board. In other embodiments, the heating layer can be embedded within the laminate between a wood composite material and a decorative top layer. The resistive heating layer can be formed into a pre-determined circuit pattern. In one embodiment, the circuit pattern comprises a series of discrete circuit elements extending along the length of the board. The elements can be connected in parallel by a pair of power buses. With this configuration, the boards can be cut to a desired length while still maintaining a substantially uniform power distribution along the board. Alternatively, the circuit elements can be connected in series.

Various additional layers, such as a moisture barrier, ground plane(s) and thermal barrier, can be bonded to the laminate flooring board for protection, safety and improved efficiency.

In still further embodiments, a radiant heating system comprises a heater insert adapted to be provided between a sub-floor and a finished floor, and a thermally sprayed resistive heating layer bonded to the heater insert. In certain embodiments, the heater insert comprises a flexible polymer film, and the resistive heating layer can be thermally sprayed directly onto the film. A second flexible polymer film can be provided over the heating layer to sandwich the heating layer between two flexible films. In other embodiments, the heater insert comprises a mica material that is comprised of a mixture of mica with an electrically insulating material such that the mixture has a higher thermal coefficient of expansion and/or a higher thermal conductivity than pure mica. This mica composite material can thereby be thermally matched to adjacent layers to reduce mechanical stresses caused by thermal cycling of the system. The heater insert of the invention is preferably adhered to a sub-floor and/or a flooring overlay using a suitable adhesive.

In yet another embodiment of the invention, a radiant heating system comprises a concrete substrate and a thermally sprayed resistive heating layer bonded to the substrate.

In various other aspects, the present invention is directed to methods of fabricating radiant heating systems having a thermally sprayed heating layer.

Thermally sprayed heating layers offer very efficient energy utilization for radiant heating systems because they are distributed over a large area. In addition, manufacturing costs are low because the heaters can be deposited directly on a structural material, such as a sub-floor or a flooring overlay material, at the factory where the materials are made. The heating system is consequently simpler, cheaper and generally easier to install as compared to conventional radiant heating systems.

DETAILED DESCRIPTION OF THE INVENTION

Figure 1:
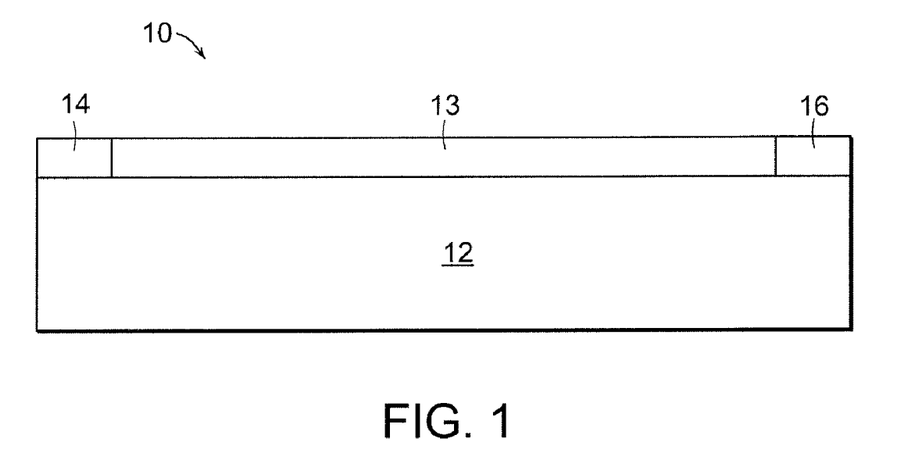
FIG. 1 is a cross-sectional view of a radiant heating system according to one embodiment of the invention.

Referring now to FIG. 1, a preferred embodiment of a radiant heating system is shown generally at 10, and includes a backer board substrate 12, a patterned resistive material 13 disposed on the substrate 12, and interconnects 14 and 16. Backer board substrate 12 may be any of a number of materials, but in a preferred embodiment it is formed of a cementous material that is designed to underlay tile or other floor finish materials.

The resistive heating material 13 is preferably formed by a thermal spray process. Thermal spray is a versatile technology for depositing coatings of various materials, including metals and ceramics. It includes systems that use powder as feedstock (e.g., arc plasma, flame spray, and high velocity oxy-fuel (HVOF) systems), systems that use wire as feedstock (e.g., arc wire, HVOF wire, and flame spray systems), and systems using combinations of the same.

Thermally sprayed resistive heating layers can be deposited on a wide variety of underlayment building materials, including for example, sub-flooring materials (e.g., cement-board, gypsum-board), wall boards, ceiling boards and sound reduction board. A radiant heating surface can thus be provided on any desired building structure, including floors, ceilings, walls and room dividers.

Building materials, such as backer boards, gypsum boards, sound reduction boards, and the like, can be pre-fabricated with a thermally sprayed heater coating. In other embodiments, the heater coating can be thermally sprayed onto a building material on-site during or after the installation of the building material.

Figure 2:
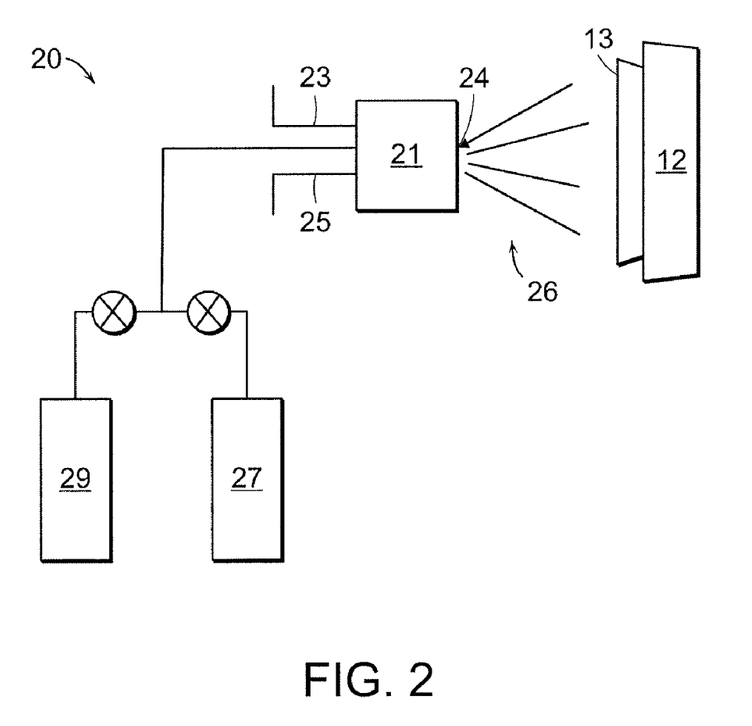
FIG. 2 is a schematic illustration of an arc-wire thermal spray system.

An exemplary embodiment of a thermal spray system 20 is shown in FIG. 2. The system 20 of FIG. 2 is an arc wire thermal spray system. Arc wire spray systems function by melting the tips of two wires (e.g., zinc, copper, aluminum, or other metal) and transporting the resulting molten droplets by means of a carrier gas (e.g., compressed air) to the surface to be coated. The wire feedstock is melted by an electric arc generated by a potential difference between the two wires.

As shown in FIG. 2, the thermal spray system 20 includes a spray head 21 (also known as a spray "gun") that is arranged above a substrate 12 to be coated. The feedstock, which in this system comprises a pair of wires 23, 25 is supplied to the spray head 21 by a feeder mechanism that controls the rate at which the feedstock material is supplied to the spray head 21. The tips of the wires 23, 25 are melted by generating an electric arc between the wires. A carrier gas is forced through a nozzle 24 in the spray head 21 and transports the molten droplets 26 at high velocity to the substrate 12 to produce layer 13. The carrier gas is supplied by one or more pressurized gas sources 27, 29. In a preferred embodiment, the carrier gas includes at least one reactant gas 27 that reacts with the molten droplets to control the resistivity of the deposited layer 13, as will be discussed further below.

The reactant gas can be controllably mixed with an inert gas 29, such as argon, to control the amount of the reaction and adjust the resistivity of the deposited layer. The gases can be fed to the spray head through flow meters and pressure regulators, or through mass flow controllers or the like, so that there is a controlled, independent flow for each gas, and of the composition of a carrier gas mixture. Reactant gas can also be injected into the molten droplet spray downstream of nozzle 24 using a separate reaction gas nozzle. The spray gun 21 is translated relative to the substrate 12 in order to build up a coating layer 13 over multiple passes. The gun 21 can be attached to a motion control system such as a linear translator or multi-axis robot. A control system, preferably a computerized control system, can control the operation of the spray gun 21.

A thermal spray system such as illustrated in FIG. 2 can be a portable system that can be brought on-site to deposit the heating layer for a radiant heating system directly in the room or space to be heated.

Other types of thermal spray systems can be used to form radiant heaters of the present invention. Arc plasma spraying is a method for depositing materials on various substrates. A DC electric arc creates an ionized gas (a plasma) that is used to spray molten powdered materials in a manner similar to spraying paint. In flame spray, a wire or powder feedstock is melted by means of a combustion flame, usually effected through ignition of gas mixtures of oxygen and another gas (e.g., acetylene). HVOF spraying uses combustion gases (e.g., propane and oxygen) that are ignited in a small chamber. The high combustion temperatures in the chamber cause a concurrent rise in gas pressure that, in turn, generates a very high speed effluent of gas from an orifice in the chamber. This hot, high speed gas is used to both melt a feedstock (e.g., wire, powder, or combination thereof) and transport the molten droplets to the surface of a substrate at speeds in the range of 330-1000 m/sec. Compressed gas (e.g., compressed air) is used to further accelerate the droplets and cool the HVOF apparatus. Other systems, typically used for materials having a relatively low melting point, impart very high velocities to powder particles such that the particles are melted by conversion of kinetic energy as they impact the substrate.

A thermal sprayed coating has a unique microstructure. During the deposition process, each particle enters a gas stream, melts, and cools to the solid form independent of the other particles. When particles impact the surface being coated, they impact ("splat") as flattened circular platelets and solidify at high cooling rates. The coating is built up on the substrate by traversing the spray apparatus (gun) repeatedly over the substrate, building up layer by layer until the desired thickness of coating has been achieved. Because the particles solidify as splats, the resultant microstructure is substantially lamellar, with the grains approximating circular platelets randomly stacked above the plane of the substrate.

Figure 3:
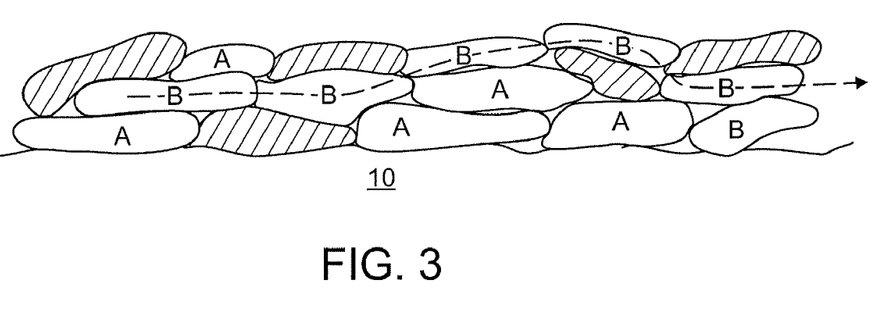
FIG. 3 is an illustration of the microstructure of a thermally sprayed heater layer in accordance with the invention.

If the starting materials for forming the resistive heating layer consists of a blend of two or more different materials, the sprayed coating microstructure can be a lamellar array of two or more kinds of grains. As shown in FIG. 3, the two different materials can be viewed as forming two interpenetrating, interconnected lattices with the degree of interconnection being a function of the proportion of material that is present. In particular, if one material happens to be electrically insulating, and one electrically conducting, then the conductivity (or resistivity) will depend on the degree of interconnectedness of the conducting material. In FIG. 3, the deposited microstructure includes three discrete phases of different materials deposited on a substrate 100. Materials A and B are insulator and conductor, respectively. The cross-hatched phase represents additional material(s) that can be optionally added for engineering purposes, such as adhesion, thermal expansion, thermal conductivity, and emissivity. The dashed line indicates the electrical current path through the lattice.

For a deposited coating to use a desired power level to generate a particular amount of heat when a voltage is applied, the coating generally must have a particular resistance that is determined by the desired power level. The resistance, R, is calculated from the applied voltage, V, and the desired power level, P, as follows:

$$R = V^2/P$$

The resistance of the coating is a function of the geometry of the coating. Specifically, the resistance of the coating can be measured in terms of the electric current path length (L), the cross sectional area (A) through which the current passes, and the material resistivity (ρ) by the following equation:

$$R = \rho \cdot L/A$$

Therefore, to design a coating for a given power level and a given geometry that will operate at a given voltage, one has only to determine the resistivity of the material using the following equation:

$$\rho = R \cdot A/L = V^2 A/(P \cdot L)$$

A composition having the necessary resistivity, ρ, can be obtained, for example, by using varying blends of conductors and insulators in the feedstock until a coating having the necessary resistivity is found empirically. According to another technique, as described in further detail below, the resistivity can be controlled, at least in part, by controlling an amount of a chemical reaction that occurs between the feedstock (such as a metal) and a gas that reacts with the feedstock (such as an ambient gas) during the deposition process.

That the resistivity is a controlled variable is significant because it represents an additional degree of freedom for the heater designer. In most situations, the resistivity of the heater material, e.g., nickel-chromium, is a fixed value. In such an instance, the heater designer must arrange the heater geometry (L and A) to obtain the desired power. For example, if it is desired to heat a tube by winding nickel-chromium wire around it, the designer must choose the correct diameter wire for A, the cross sectional area through which the electric current must pass, and the spacing of the windings for L, the total path length of the electric current.

Thermally sprayed coatings that behave as electrical heaters can be composed of any electrically conducting material, but it is generally advantageous to choose materials that possess high electrical resistivity. This allows generation of power with high voltages and lower currents, preferably commonly used voltages such as 120 V or 240 V. It can be even more advantageous to boost the resistivity of heater coatings greater than the typical value of common materials, e.g. nickel-chromium, by adding insulating components, such as metal oxides, to the thermally sprayed coating layer. This has the effect of allowing the design of heater coatings with compact dimensions, in particular shorter current paths, and making them eminently practical for use in a variety of applications.

According to one aspect of the invention, a heater coating deposited by thermal spray comprises an electrically conductive material and an electrically insulating material, the electrically insulating material having a higher electrical resistance than the electrically conductive material, such that the bulk resistivity (ρ) of the heater coating is raised relative to the electrically conductive material. In certain embodiments, the bulk resistivity is raised by a factor of approximately $10^1$ or more. In other embodiments, the bulk resistivity is raised by a factor of about $10^1$ to about $10^3$ above the resitivity of the electrically conductive material. According to certain embodiments, the content of the insulating material(s) in the heater coating comprises at least about 40% by volume, and in a preferred embodiment, between about 40-80% by volume.

Examples of materials that can be used to form an electrically conductive component in a thermally sprayed heater coating include, without limitation, carbides such as silicon carbide or boron carbide, borides, silicides such as molybdenum disilicide or tungsten disilicide, and oxides such as lanthanum chromate or tin oxide which have electroconducting properties that are appropriate for the technology. For the insulating material, oxides are very good in the application, particularly $Al_2O_3$, which is refractory, insulating, and inexpensive. Aluminum nitride and mullite are also suitable as insulating materials.

Metallic component feedstocks can also be used to form the electrically conductive component of the heater coating, and in particular metallic components that are capable of forming an oxide, carbide, nitride and/or boride by reaction with a gas. Exemplary metallic components include, without limitation, transition metals such as titanium (Ti), vanadium (V), cobalt (Co), nickel (Ni), and transition metal alloys; highly reactive metals such as magnesium (Mg), zirconium (Zr), hafnium (Hf), and aluminum (Al); refractory metals such as tungsten (W), molybdenum (Mo), and tantalum (Ta); metal composites such as aluminum/aluminum oxide and cobalt/tungsten carbide; and metalloids such as silicon (Si). These metallic components typically have a resistivity in the range of $1-100 \times 10^{-8}$ Ω·m. During the coating process (e.g., thermal spraying), a feedstock (e.g., powder, wire, or solid bar) of the metallic component is melted to produce droplets and exposed to a reaction gas containing oxygen, nitrogen, carbon, and/or boron. This exposure allows the molten metallic component to react with the gas to produce an oxide, nitride, carbide, or boride derivative, or combination thereof, over at least a portion of the droplet.

The nature of the reacted metallic component is dependent on the amount and nature of the gas used in the deposition. For example, use of pure oxygen results in an oxide of the metallic component. In addition, a mixture of oxygen, nitrogen, and carbon dioxide results in a mixture of oxide, nitride, and carbide. The exact proportion of each depends on intrinsic properties of the metallic component and on the proportion of oxygen, nitrogen, and carbon in the gas. The resistivity of the layers produced by the methods herein range from $500-50,000 \times 10^{-8}$ Ω·m.

Exemplary species of oxide include $TiO_2$, $TiO$, $ZrO_2$, $V_2O_5$, $V_2O_3$, $V_2O_4$, $CoO$, $Co_2O_3$, $CoO_2$, $Co_3O_4$, $NiO$, $MgO$, $HfO_2$, $Al_2O_3$, $WO_3$, $WO_2$, $MoO_3$, $MoO_2$, $Ta_2O_5$, $TaO_2$, and $SiO_2$. Examples of nitrides include $TiN$, $VN$, $Ni_3N$, $Mg_3N_2$, $ZrN$, $AlN$, and $Si_3N_4$. Exemplary carbides include $TiC$, $VC$, $MgC_2$, $Mg_2C_3$, $HfC$, $Al_4C_3$, $WC$, $MO_2C$, $TaC$, and $SiC$. Exemplary borides include $TiB$, $TiB_2$, $VB_2$, $Ni_2B$, $Ni_3B$, $AlB_2$, $TaB$, $TaB_2$, $SiB$, and $ZrB_2$. Other oxides, nitrides, carbides, and borides are known by those skilled in the art.

In order to obtain oxides, nitrides, carbides, or borides of a metallic component, the gas that is reacted with the component must contain oxygen, nitrogen, carbon and/or boron. Exemplary gases include, for example, oxygen, nitrogen, carbon dioxide, boron trichloride, ammonia, methane, and diborane.

During the thermal spray process, when the molten droplets of the metallic feed react with ambient gas present in the flux stream, the composition of the coating differs from that of the feedstock. The droplets can obtain, for example, a surface coating of the reaction product (e.g., an oxide, nitride, carbide, and/or boride derivative of the metallic component). Some droplets can react completely, while others can retain a large fraction of free metal, or can remain un-reacted. The resulting microstructure of the coating is a lamellar structure, which can consist of individual particles of complex composition. The coating has a reduced volume fraction of free metal with the remainder consisting of reaction products. When the gases that are added to the flux stream are chosen to form reaction products having a higher electrical resistivity than the starting metallic material, then the resulting coating exhibits a bulk resistivity that is higher than the free metallic component. The concentration of reaction product, and thus the resistivity of the coating layer, can be controlled, at least in part, by controlling the concentration of the reaction gas.

In certain embodiments, the resistivity of the heater coating can be further enhanced by selecting a feed stock for a thermal spray process that includes at least one electrically conductive component and at least one electrically insulating component, and where at least one component of the feed stock comprises a metallic component that reacts with a reactant gas during the thermal spray process to produce a reaction product having a higher resistivity than the free metallic component. For example, in one preferred embodiment of the invention, the feed stock for the thermally sprayed heater layer comprises a flat metal ribbon that is formed into a wire that surrounds a core of an insulating material. The insulating material can be a powder, such as a powdered ceramic. In one embodiment, a flat metal ribbon is formed into a wire over an insulating powder of aluminum oxide. This "cored" wire is then thermally sprayed, preferably using a twin arc wire system, in the presence of a reaction gas, to produce a coating on a suitable substrate. The resulting thermally sprayed coating is characterized by substantially increased resistivity relative to aluminum alone, as a result of both the ceramic aluminum oxide powder in the feed material, as well as the electrically insulative reaction product (e.g., aluminum oxide) formed by the reaction of the molten aluminum metal and the reaction gas (e.g., oxygen). Thus, a cored wire feed stock of aluminum metal and aluminum oxide ceramic provides the benefit of the extraordinary sticking power of aluminum and the high-resistivity of a large volume fraction of aluminum oxide where normally aluminum, even with an oxidized component, typically has a low resitivity.

According to one aspect of the invention, resistive layers may be formed into defined patterns on a substrate. The pattern may be defined, for example, by thermally-spraying the resistive material through a removable mask or stencil. Other masking techniques include the use of dissolvable protective coatings, e.g., photoresist. Patterned application allows for the fabrication of more than one spatially separated resistive layer on one or more substrates. Patterned layers allow for controlled heating in localized areas of a substrate.

A thermally sprayed layer may be patterned by cutting or scribing a path in a deposited coating. In microabrading, for instance, a blaster emitting an abrasive powder, e.g., aluminum oxide or silicon carbide, is used to abrade resistive material in a defined area. Coupling the blaster to a multiaxis robot translator or motion controller enables the outlining of specific geometries, e.g., a resistive path, on a coated surface. Microabrading can be controlled to cut through only one layer, e.g., the resistive layer, while keeping the underlying substrate and any intermediate layers intact. Microabrading eliminates the need for masking during deposition. Suitable microabrading equipment is available from, for example, Comco, Inc. in Burbank, Calif. and S.S. White Technologies, Inc. of Piscataway, N.J.

The thermally sprayed layer can also be patterned using micromachining (e.g., cutting with a diamond-coated tool), laser cutting, chemical etching, e-beam etching, and other techniques known in the art.

Figure 4:
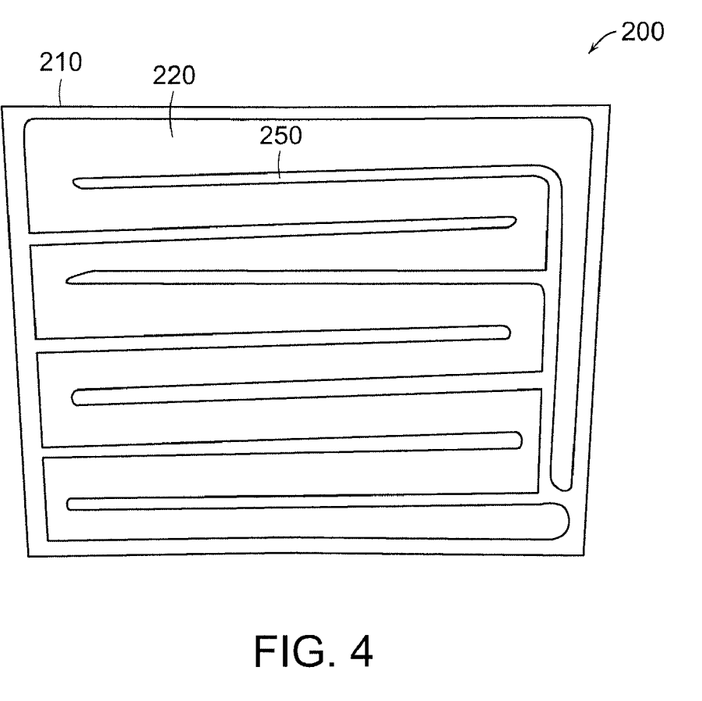
FIG. 4 is a plan-view of a thermally sprayed heater for a radiant heating system.

An exemplary embodiment of a thermally sprayed heater 201 for a radiant heating system is shown in FIG. 4. As can be seen in FIG. 4, the resistive heater layer 220 comprises a defined circuit pattern on the substrate 210, separated by insulated regions 250. In one embodiment of the present invention, the patterned, thermally sprayed heater layer 220 is applied to a sub-flooring material substrate 210. The sub-floor material substrate 210 can comprise a cementitious material, such as a gypsum-based material, that is provided upon a base layer, such as wooden plywood or particle board. The sub-floor can comprise a pre-fabricated backer board, such as the FIBEROCK® brand gypsum board made by United States Gypsum Company of Chicago, Ill.

In certain other embodiments, the sub-floor material substrate 210 comprises a cementitious product that is poured over a substrate, leveled and set on-site. An example of this type of sub-floor product is the LEVELROCK® floor underlayment from United States Gypsum Company. A thermally sprayed heater coating can be provided on the gypsum-based sub-flooring material, either prior to installation of the sub-floor (in the case of pre-fabricated gypsum board) or at the time of installation of a board-based or poured-in sub-flooring material.

In certain embodiments, the sub-floor may need to be first prepared with a bond coat in order to receive the thermally sprayed heater coating. Generally, the principle mechanism of bonding for a thermally sprayed coating is by mechanical interlock with the substrate. A conventional preparation technique is to grit blast the substrate to roughen the surface, but this is difficult with cement-like materials that have little cohesive strength in their composition. Instead, a bond coat that adheres to the sub-floor and provides sufficient hardness and thickness for grit blasting can be applied. Epoxies or other paint-on materials can be used as a bond coat. In some embodiments, a paint-on material can be mixed with a powdered insulator, such as aluminum oxide, to provide a suitable hard and rough surface. If a heater material with a low melting point is used, such as, for example, aluminum or cored aluminum with aluminum oxide, the heaters can have high adhesion without pre-roughening. Then, polymers or other paints may be used without further preparation before coating deposition.

Figure 5:
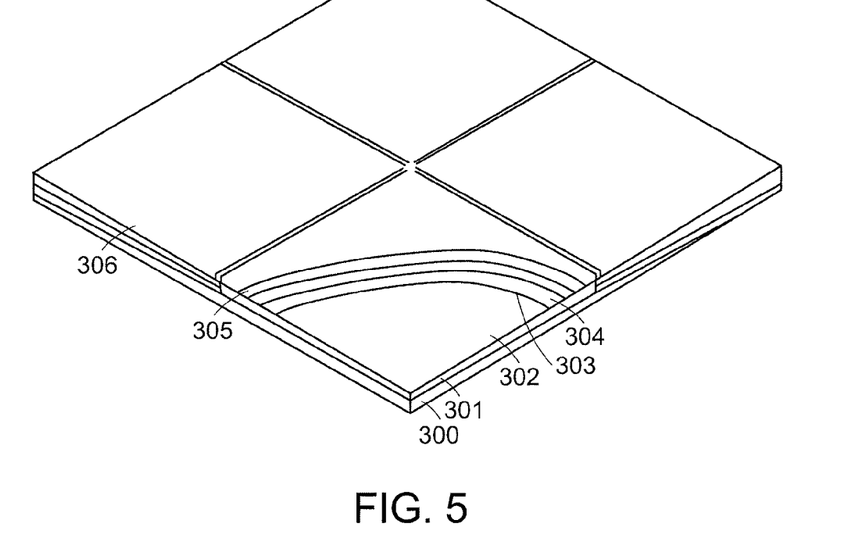
FIG. 5 illustrates a radiant heating system having thermally sprayed heating layer on a sound reduction board.

FIG. 5 illustrates a heater coating system for radiant heating of tiles with a sound reduction board 301. A sound reduction board (SRB) is typically used on top of a wooden base floor with a poured-in gypsum overlay for strength and hardness. The SRB 301 is first fastened to the base floor 300 (e.g., plywood) and then coated with an epoxy bond coat 302. In a preferred embodiment, the bond coat 302 contains a powdered insulator, such as an aluminum oxide powder. The bond coat 302 can be roughened, such as by grit blasting, to promote adhesion by a thermally sprayed resistive heating material. The heater coating 303 is then deposited on the SRB 301 and bond coat 302 by thermal spray and formed into a predetermined circuit pattern. It will be understood that the heater coating 303 can be applied during the manufacturing of the SRB 301 to provide a pre-fabricated SRB/heater panel. A moisture barrier/ground plane 304 comprising an adhesive polymer film with aluminum foil bonded to the top side of the film is applied on top of the heater coating 303. The gypsum-based filler material 305 is poured over the moisture barrier, leveled, and thoroughly dried. It will be understood that a pre-fabricated gypsum board could be used instead of a poured-in material. Finally, the upper flooring layer, which in this embodiment comprises ceramic tile flooring 306, is secured to the gypsum-based filler material 305.

Figure 6:
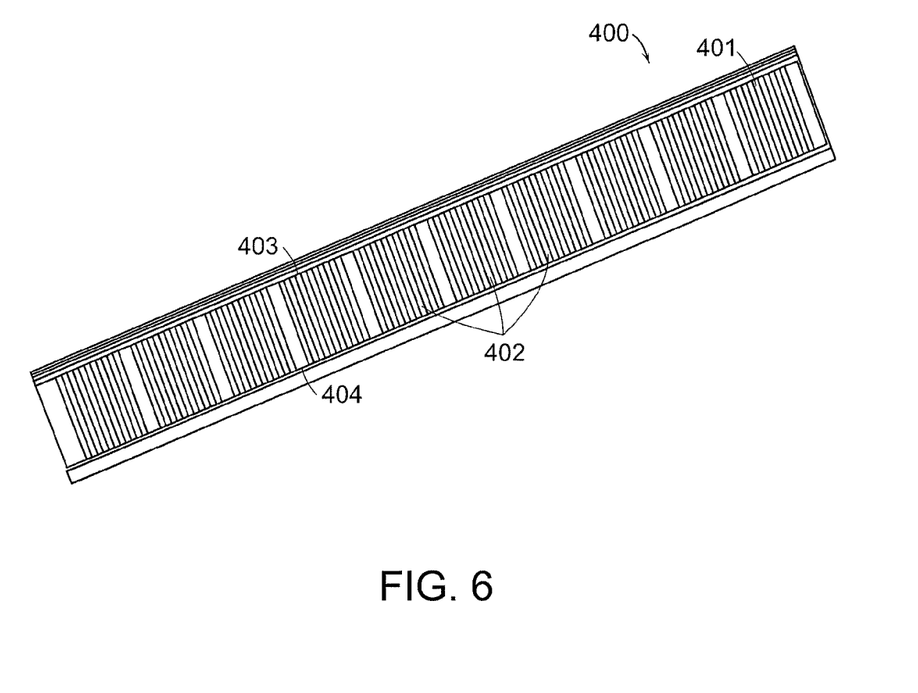
FIG. 6 illustrates a laminate flooring board having a thermally sprayed resistive heating layer on the underside of the board.
Figure 7:
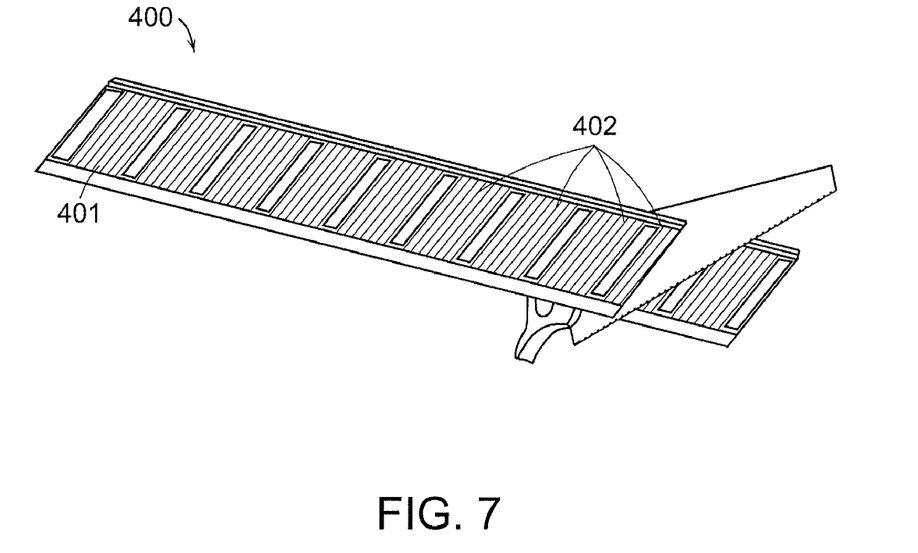
FIG. 7 illustrates the laminate flooring board of FIG. 6 being cut to length.

In other embodiments, a heater coating for radiant heating can be applied directly to the upper flooring layer. FIGS. 6 and 7 depict a heater coating 401 that has been deposited directly onto the underside of a laminate flooring board 400. The heating elements 402 are shown arranged in a parallel circuit configuration so that the board 400 may be cut (see FIG. 7) while preserving uniform power distribution over the board and not interrupting the circuit. This circuit configuration allows the electrical connections in the form of jumpers from board to board to be located on one side of the installation, e.g., along one wall, in a small space. Other circuit arrangements are possible.

In addition to laminate boards, heater coatings can be directly applied to numerous other materials used for flooring overlays, such as tile, wood composites, natural wood, stone, brick, linoleum and carpeting.

Preparation of the overlay material for coating typically includes grit blasting the underside of the material with a light (e.g., 60 Ga) aluminum oxide or other media grit. With certain materials, a bond coat can first be applied to provide additional hardness and thickness for grit blasting. Heater materials can range from low melting point alloys such as aluminum, which often do not require grit blasting, to resistive metals such as iron-chromium and nickel-chromium alloys. Various additional layers can be provided, such as a dielectric layer between the heater layer and the flooring overlay, as well as layers to provide improved thermal matching between the heater layer and the flooring material. For tiles or other ceramic flooring materials, it may be advantageous to utilize a ceramic material for the heater layer, such as a blend of electro-conductive ceramic material(s) with electrically insulating ceramic material(s). This provides a good match in thermal expansion coefficients between the heater and substrate.

Figure 8:
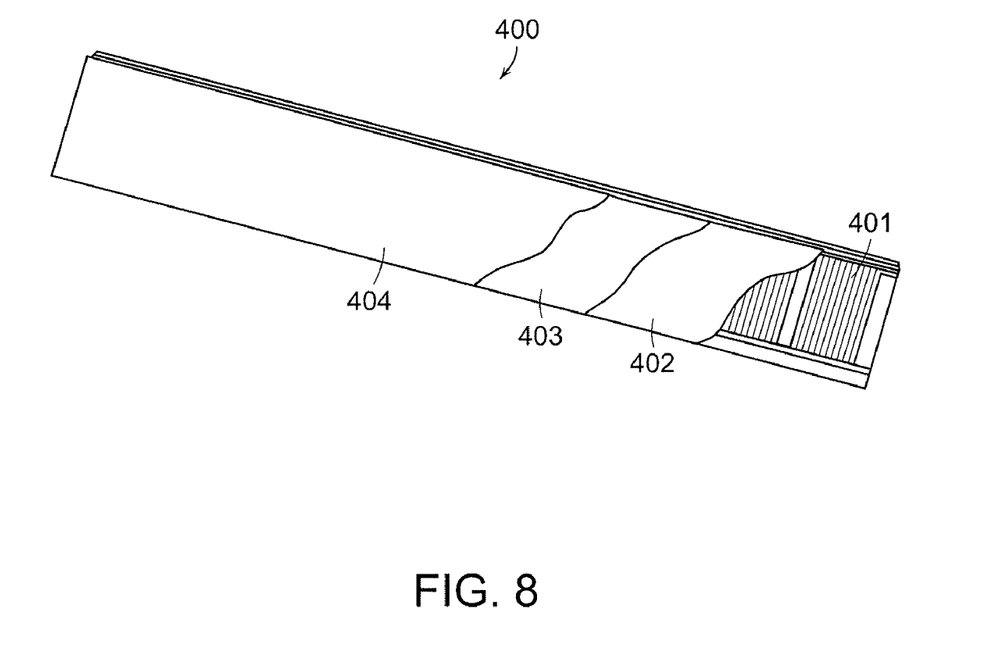
FIG. 8 shows a heated laminate flooring board having moisture barrier, ground plane and thermal insulation/noise reduction overlayers.

FIG. 8 illustrates one example of a laminate flooring board 400 with a heater coating 401 applied directly to the underside of the laminate flooring board 400. In addition to the heater coating 401, the flooring board 400 can include one or more additional layer(s) provided on the heater coating 401. In the embodiment of FIG. 8, a moisture barrier layer 402 is provided on the heater coating 401. The moisture barrier layer 402 can be a polymer or silicone film, for example, and can be sprayed on or laid with a suitable adhesive. The moisture barrier layer 402 protects the heater coating 410 and the overlying flooring material (e.g., a wood product) from moisture.

A second additional layer is provided on the moisture barrier layer 402, and can comprise a ground plane 403. The ground plane 403 can comprise a layer of a conductive material, such as aluminum foil. When electrically grounded, the ground plane 403 can permit detection of leakage currents that could constitute a safety hazard by a ground fault interrupter. The ground plane 403 can also serve as a conventional path to ground to trip a circuit breaker in the case of an unwanted short circuit, such as a nail being driven through the heater, or in the case of a flood. The ground plane 403 can also serve as an EMI/RF shield to suppress any unwanted radiofrequency signals that the heater coating might manifest or pick up.

A third layer is provided on the ground plane layer 403, and can comprise a thermal barrier layer 404. The thermal barrier layer 404 is characterized by low thermal conductivity, and serves as a barrier to the flow of heat downwards. The thermal barrier layer 404 can comprise, for example, a low density polymer film that is adhered to the ground plane 403 with glue. This layer 404 can also serve as a noise attenuator since laminate floors are not normally attached to the sub-floor and are consequently prone to squeaking and other noises.

In one embodiment, the three additional layers 402, 403 and 404, can be incorporated into a composite film with an adhesive for attachment to the laminate flooring board 400. It will be understood that the present embodiment is illustrative only, and that the heated laminate flooring board 400 can include any number of additional layers, in any suitable arrangement or order. In other embodiments the heated laminate flooring board 400 can have no additional layers.

Figure 9:
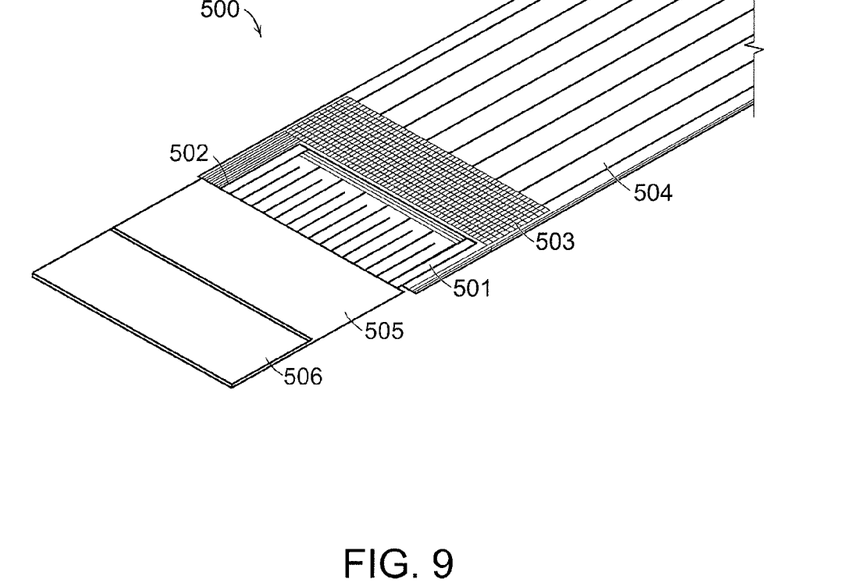
FIG. 9 is a partial cut-away view of a laminate flooring board having an embedded resistive heating layer.

FIG. 9 illustrates an embodiment of a laminate flooring board 500 with an embedded heater coating 501. In this embodiment, the heater coating 501 is deposited on a wood composite material 502 during the laminate board manufacturing process. After the heater coating 501 is deposited, a wire mesh 503 is laid down, and one or more upper layers, including the top decorative surface layer 504, is attached. Since the wood composite material often has low thermal conductivity, placing the heater coating 501 just below the surface layer 504 can provide more efficient energy usage and transfer. This can also obviate the need for a moisture barrier and thermal barrier. FIG. 9 also illustrates a second ground plane 505 that, together with wire mesh 503, can completely isolate the heater 501 from EMI/RF interference and offer an increased measure of safety. Also shown in FIG. 9 is a noise reduction layer 506 that can be provided as the lowermost layer of the laminate board 500.

A heater coating of the invention need not be applied directly to the sub-floor or overlay. Instead, the coating can be applied to a separate substrate that is inserted between the sub-floor and the overlay. Insert-type systems have the advantage of being manufactured apart from the flooring or sub-flooring, and they are independent of the type of flooring materials being used. The same heater insert can be used for heating tile systems or laminates, for example.

Thermal spray methods can be adapted for the deposition of many materials that melt congruently, i.e., any material that doesn't decompose or sublimate. Furthermore, thermal spray is capable of depositing coatings on many different substrates provided they are suitably prepared before deposition. Preparation usually involves roughening the substrate because the coating bond strength is proportional to the degree of roughness of the substrate as the principle mechanism of bonding in thermal spray is a mechanical interlock of coating and substrate. Substrates can be metals, ceramics, polymers, or glasses.

Figure 10:
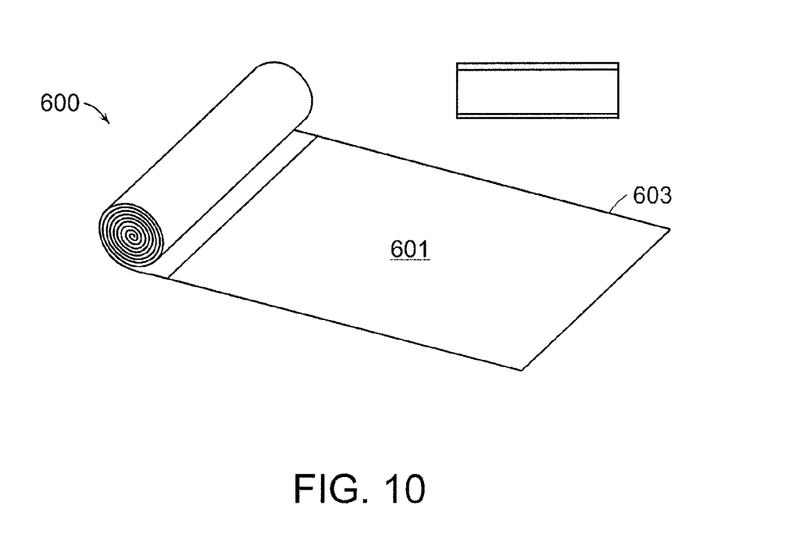
FIG. 10 illustrates a flexible heating system for insertion between a sub-floor and overlay.
Figure 11:
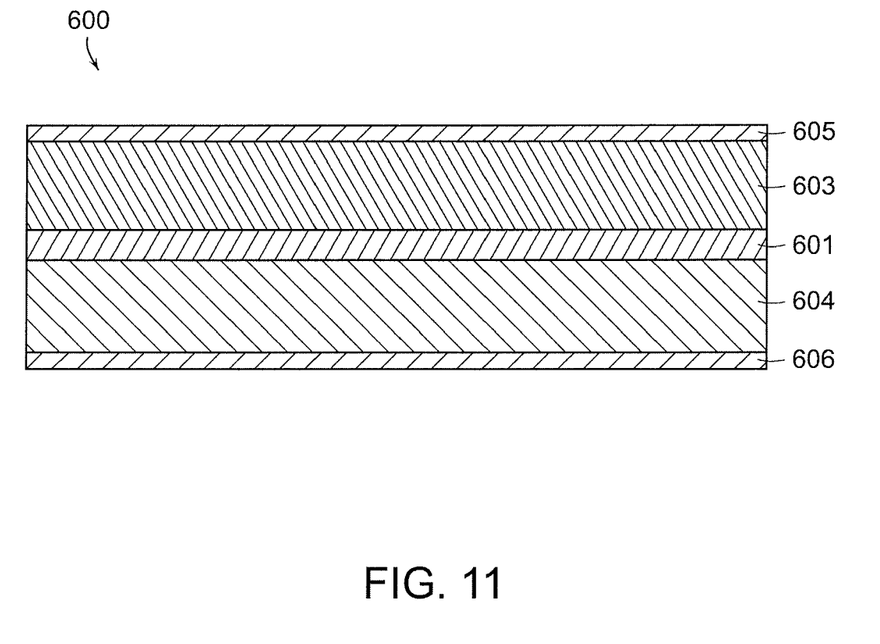
FIG. 11 is a cross-sectional view of the flexible heating system of FIG. 10.

FIGS. 10 and 11 illustrate a flexible heating system 600 that comprises heater coatings 601 deposited directly on a flexible material 603, such as polyimide or another suitable polymer. The circuit patterns can be designed so that cut-outs in the heating system 600 do not interrupt current flow and power distribution is uniform regardless of the final shape of the system. In the system show, the heater coating 601 is sandwiched between two polymer films 603, 604 and an aluminum ground foil plane 605, 606 is bonded to the top and bottom of the system 603. An adhesive material can be used to attach the heater system 603 to a sub-floor and/or flooring material.

Figure 12:
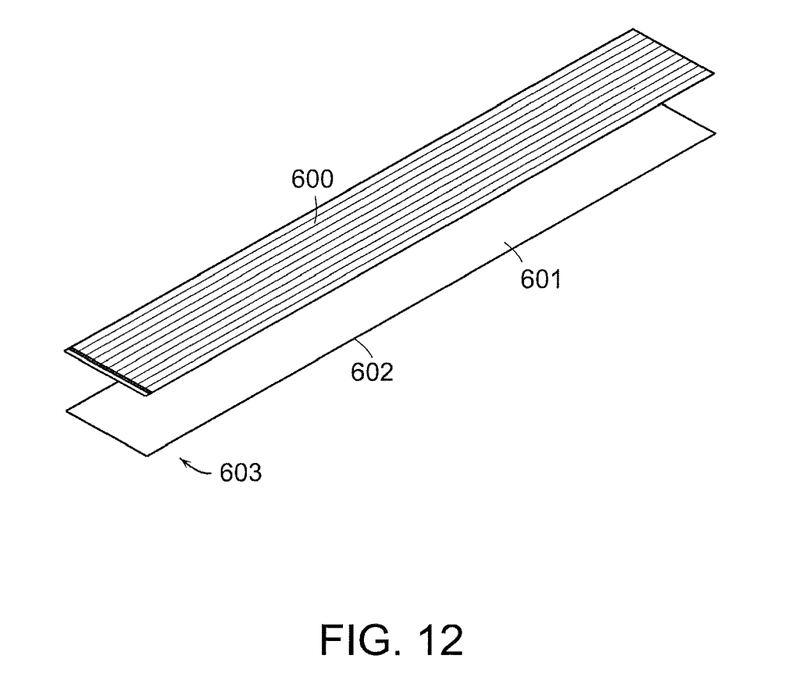
FIG. 12 illustrates a laminate board with a mica insert having a resistive heating layer.

A heater insert can also be formed of a rigid or semi-rigid substrate, such as mica or mica composite materials as described herein, or various polymers, upon which a heater coating is deposited. FIG. 12 shows a heater insert 602 comprising a mica sheet 601 cut to the size of a laminate board 600 and containing a thermally sprayed heater coating 603. The heater coating can be protected by a moisture barrier and ground plane. Adhesive layers may be applied to the interface of the insert 602 and the flooring overlay 600, as well as to the interface with the underlying sub-floor.

Mica is a naturally occurring mineral found in two forms, muscovite and phlogopite. For industrial use, the raw material is pulverized and blended with a binder, then subjected to simultaneous pressure and temperature to form a dense, stable material. The surface of the finished product is typically smooth and free from porosity. The microstructure is typically crystallites with plate-like morphology that have poor intercrystalline bonds.

Mica is a desirable substrate for heater coatings for certain applications. The material has very high dielectric strength, so a dielectric layer need not be deposited first before the heater layer as in the case of metal substrates. It is inexpensive, which makes it suitable for low cost, high volume applications. It can be formed into sheets that are easily cut but have acceptable mechanical strength; and it is refractory enough to withstand maximum temperatures as high as 1200° C.

One deficiency with mica as a substrate for heater coatings is low thermal expansion. The bulk thermal expansion of mica is typically lower than most metallic based heater coatings. Therefore, when the structure heats up, a stress state builds at the substrate-coating interface due to thermoelastic stresses. These stresses can cause bending of the substrate or even delamination of the coating.

A second drawback with mica is that it is difficult to prepare using conventional methods for thermal spray coatings. That is, mica is difficult to roughen using mechanical means such as grit blasting or through the use of an abrading tool. That is because of its crystalline microstructure which does not undergo plastic deformation like a metal nor does it manifest simple grain pull-out like many ceramics. Rather, the mica tends to flake and disintegrate when roughened as well as develop micro fractures below the remaining surface.

A third issue with mica is that it has extremely low thermal conductivity. Thus, when a high temperature heater coating is deposited on it, the thermal energy generated in the heater does not flow easily to uncoated areas as in a metal. Rather, large temperature gradients are set up that induce commensurately large thermal expansion gradients. These gradients create stresses which can exceed the fracture strength of the mica and cause cracking.

To address the problems associated with mica, certain embodiments of the present invention utilize the insertion of an electrical insulator, such as aluminum nitride, into a mica powder during fabrication to form a mica composite material. The insulator can be selected to have a higher thermal conductivity than pure mica to thereby increase the resulting bulk thermal conductivity of the substrate. In another preferred embodiment, a high temperature electrical insulator such as zirconium oxide, aluminum oxide and/or magnesium oxide or a silicate possessing a higher thermal expansion coefficient relative to pure mica can be used to improve the thermal matching properties of the layered heater structure. A plurality of mica layers formed using this process can be used to form a laminate substrate and heater composite.

Additionally, the mica surface can be fabricated with a more porous surface to increase mechanical adhesion of the thermally sprayed coating to the mica surface. In particular, the mica composite material, or other substrate material, can be made with a powder in which the particle size and binder volume are adjusted to roughen the surface by increasing the number and/or size of pores at the surface such that mechanical roughening is not necessary.

Finally, it is difficult to apply a coating to a heater deposited on mica that needs to operate at high temperatures. Such overcoats are often necessary to ensure electrical safety or to protect the heater from environmental attack. At low temperatures, there are various polymeric and silicone materials that can be over laid, however above about 300° C., silicates or other ceramic materials can be used.

Figure 13:
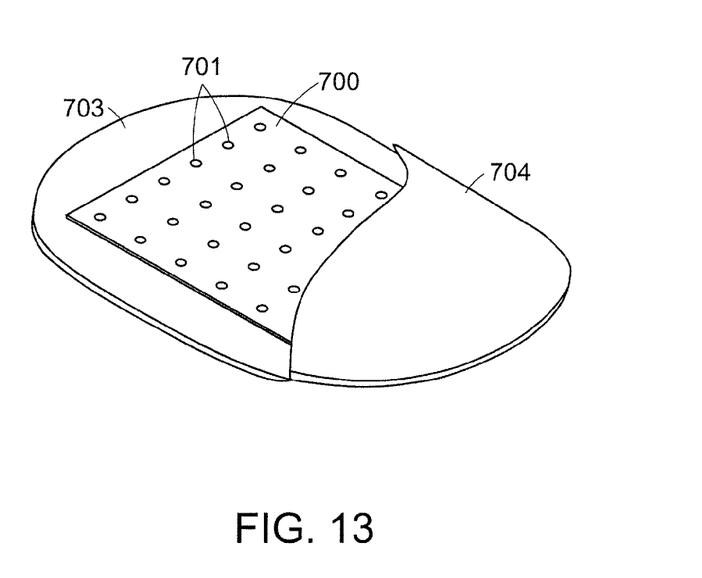
FIG. 13 is a partial cutaway view of a heater panel set in a cement substrate with a stone overlay.

A heater of the present invention can also be used for heating floors or other surfaces that are provided over concrete. After the concrete is poured and set, a heater coating can be thermally sprayed directly onto the concrete. A bond coat can be provided on the concrete and the heater coating deposited on the bond coat for improved adhesion. In other embodiments, a separate heater insert can be provided between a concrete base and an overlay material. When a separate heater insert is used, the insert and associated wiring can be set while the concrete is still wet. As shown in FIG. 13, a heater insert 700 includes holes 701 which can permit wet cement to help anchor the panels to the concrete matrix 703. An overlay 704, which in FIG. 13 comprises a stone overlay for a driveway, can be provided over the heater insert 700. Thermally sprayed heater systems provided on a concrete base can be used for numerous applications, such as a basement or garage floor heater, and can be useful for de-icing concrete surfaces such as driveways, walkways, sidewalks and roads, as well as aircraft runways and tarmacs.

As previously discussed, the thermal spray process for heater coatings can comprise depositing a heater layer in a pre-determined circuit pattern by spraying through a mask or stencil. Alternatively, a contiguous layer can be deposited and then cut into the desired pattern using a laser or other cutting mechanism. The circuit patterns can be complex or simple. It is generally desired that the heater is configured to provide relatively uniform power density over the surface of the floor, and to maintain that power density regardless of any cut-outs that are made to the heater. The thermal spray process offers four degrees of freedom in the heater design: material resistivity, length of current path, width of current path and thickness of the current path. All four parameters can be used to advantage. For example, bus bars and contact areas can be made wide to reduce resistance. The heater can be designed with wide, parallel circuits to minimize thickness and reduce passes of the spray gun and hence reduce manufacturing time. Parallel circuits also ensure that heat will continue to be developed in the floor even if one or more individual heating elements fail.

Since floor and ceiling panels are usually sized as square panels, e.g., 2 ft.×2 ft., the heater circuits deposited on them should be configured to permit easy interconnection. Ideally, a surface such as a floor that is covered by heating panels should only have two electrical power wires attached to a single panel at one location, for example, in a corner of the room. The remaining panels can be connected to each other by the installer using simple, standard-size connectors. If standard connectors of some fixed length are used, then circuits mush have power buses placed to always accommodate the connectors. Therefore, for a 120 volt system, the power (hot) bus, a neutral bus, and a ground of adjacent panels should always be the same distance apart when laid as a sub-floor.

FIG. 6 illustrates one embodiment of an electrical circuit configuration for a heated laminate board flooring system. The circuit includes two buses, power 403 and neutral 404, as is required for 120 volt usage. The buses 403, 404 are coatings that can be deposited concurrently with the heater coating. In other embodiments, the buses can be separate conductive elements, such as conductive foils, copper strips, etc., that are attached by screws or other suitable fasteners. Between the two buses 403, 404 are individual heating elements 402 that are connected in parallel.

Figure 14:
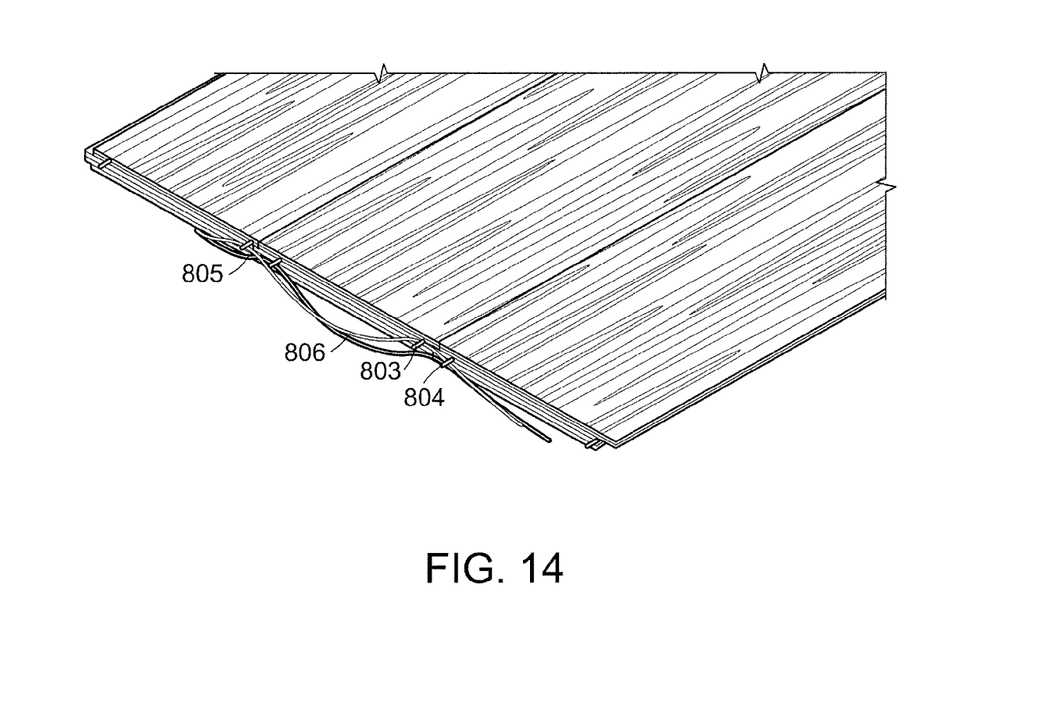
FIG. 14 illustrates a plurality of heated laminate boards with electrical interconnections.

As shown in FIG. 14, a laminate board can include connectors 803, 804 that penetrate into the board and make contact with the heater buses. The connectors 803, 804 can be embedded in the laminate during manufacturing, or can be added during installation. Jumpers 805, 806 can be connected to connectors 803, 804 and interconnect adjacent boards. In a preferred embodiment, all of the interconnections between boards are made on one side of the room. Connectors at the opposite end of the boards can be cut off during installation, and the ends can be sealed with a liquid sealant to prevent moisture penetration.

Figure 15:
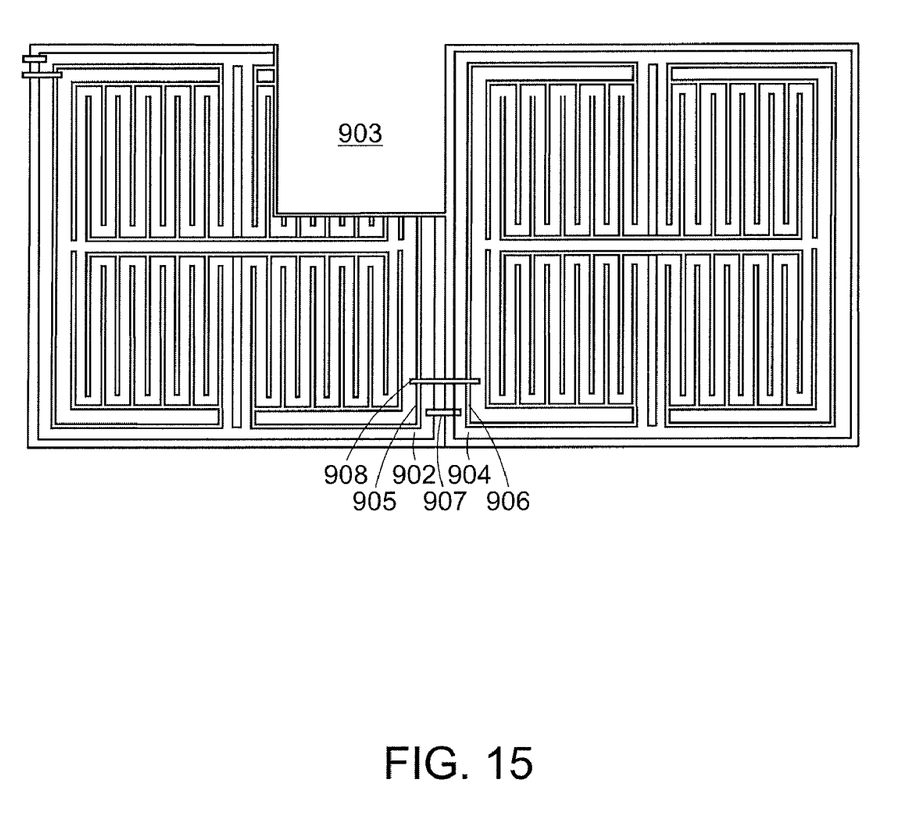
FIG. 15 illustrates two sound reduction board panels with patterned resistive heating circuits and electrical interconnections.

One embodiment of an electrical circuit configuration for a radiant heating panel system is shown in FIG. 15. Such a configuration could be used, for example, when the heating layer is deposited on a sub-flooring material, such as gypsum board or a sound reduction board. As shown in FIG. 15, one panel includes a cut-out 903 portion to illustrate the property that heat is still generated around the hole despite the fact that the circuit is interrupted. Adjacent panels can be jumped, hot bus 902 to hot bus 904 and neutral bus 905 to neutral bus 906, at any point along the abutting edges. As illustrated in FIG. 15, the connectors 907, 908 for connecting the adjacent panels have two different lengths. A first connector 907 having a first length is used to connect two buses of a first type (i.e., hot or neutral), and a second connector 908 having a different length is used to connect buses of the second type. Preferably, the relative spacing of the hot and neutral buses across all the panels remains constant so that each different length connector can only connect the same type buses. To further facilitate the connecting process, the location of the buses can be marked, such as by printing color strips (e.g., black for power, white for neutral) on the moisture barrier overlay. The connectors themselves can also be color-coded with the same colors. In this embodiment, the entire floor heating system can be fully interconnected with only two power wires (and ground) attached at one corner of the installation.

Any suitable electrical connectors can be utilized, although the connectors should conform well to the heating system and meet certain criteria. The connectors must conform to generally accepted safety standard (e.g., UL, CSA, etc.). They should be easy to attach, take up little space, and simple in design. Also, if a ground plane is used, the connectors should have a grounding feature similar to the heating system so that, for example, if a nail is driven through the floor and it encounters a connector, it will not become energized but will rather trip a circuit breaker or other safety device.

Examples of resistive heater coating layers and methods for the fabrication of heating elements, and various applications for heater coating layers, are described in commonly-owned U.S. Pat. Nos. 6,762,396, 6,919,543, and 6,294,468, in commonly-owned U.S. Published Patent Applications Nos. 2003/0121906 A1, 2005/0252906 A1, and 2006/0288998 A1, and in U.S. patent application Ser. No. 12/070,713, filed on Feb. 20, 2008, and 61/126,095, filed on May 1, 2008. The entire teachings of the above-referenced patents and patent applications are incorporated herein by reference.

Although various embodiments of radiant heaters are described in connection with resistive heating layers formed by thermal spray, it will be understood that radiant heaters of the type described herein can include various types of electrical resistive heaters, including, for example, resistive heaters deposited as coatings using sputtering, sol-gel, ion implantation, evaporation, chemical vapor deposition and various thick film technologies such as screen printing and dispensing. Other resistive heaters that cover a surface, such as thin foils and flexible heaters, are also applicable to the radiant heaters described herein.

While the invention has been described in connection with specific methods and apparatus, those skilled in the art will recognize other equivalents to the specific embodiments herein. It is to be understood that the description is by way of example and not as a limitation to the scope of the invention and these equivalents are intended to be encompassed by the claims set forth below.

What is claimed is:

1. A radiant heating system comprising:
a laminate flooring board;
a thermally sprayed resistive heating layer bonded to the laminate flooring board;
at least one electrical connector for providing electrical power to the resistive heating layer;
wherein the resistive heating layer is patterned to provide an electrical circuit, and at least two electrical connectors are in electrical contact with the resistive heating layer to provide a voltage across the circuit;
wherein the laminate flooring board has a length and a width, and wherein the heating system comprises a pair of buses in electrical contact with the resistive heating layer and extending along the length of the flooring board; and
wherein the resistive heating layer is patterned to provide a plurality of circuits extending along the length of the flooring board and connected in parallel by the pair of buses.

2. The radiant heating system of claim 1, wherein the pair of electrical connectors are located at one end of the flooring board and form an electrical connection with the pair of buses.

3. A radiant heating system comprising:
a laminate flooring board;
a thermally sprayed resistive heating layer bonded to the laminate flooring board; and
at least one electrical connector for providing electrical power to the resistive heating layer;
wherein the resistive heating layer comprises a first material and a second material, wherein the first material is an electrically conducting material and the second material is an electrically insulating material; and
wherein the bulk resistivity of the resistive heating layer is higher than the resistivity of the conductive material by a factor of about 10 or more.

4. The radiant heating system of claim 3, wherein the bulk resistivity of the resistive heating layer is higher than the resistivity of the conductive material by a factor of about 10 to about 1000.

5. A radiant heating system comprising:
a laminate flooring board;
a thermally sprayed resistive heating layer bonded to the laminate flooring board; and
at least one electrical connector for providing electrical power to the resistive heating layer;
wherein the resistive heating layer comprises a first material and a second material, wherein the first material is an electrically conducting material and the second material is an electrically insulating material; and
wherein the content of the electrically insulating material in the resistive heating layer comprises at least about 40% by volume.

6. The radiant heating system of claim 5, wherein the content of the electrically insulating material in the resistive heating layer comprises between about 40-80% by volume.

7. A radiant heating system comprising:
a laminate flooring board;
a thermally sprayed resistive heating layer bonded to the laminate flooring board; and
at least one electrical connector for providing electrical power to the resistive heating layer;
wherein the resistive heating layer comprises a first material and a second material, wherein the first material is an electrically conducting material and the second material is an electrically insulating material;

wherein the electrically conductive material comprises a metallic material; and wherein the electrically insulating material comprises a reaction product of the metallic material.

8. The radiant heating system of claim 7, wherein the reaction product comprises at least one of an oxide, a nitride, a carbide and a boride.

9. The radiant heating system of claim 7, wherein the electrically insulating material comprises a thermally sprayed insulating material and a reaction product of the electrically conducting material.

10. A method of fabricating a radiant heater, comprising:

providing a laminate flooring board;

thermally spraying a material to form a resistive heating layer; and bonding the resistive heating layer to the laminate flooring board.

11. The method of claim 10 further comprising thermally spraying the material onto a surface of the laminate flooring board to bond the resistive heating layer to the laminate flooring board.

12. The method of claim 10 wherein the laminate flooring board comprises a decorative upper surface and an underside surface, and the resistive heating layer is bonded to the underside surface.

13. The method of claim 10 further comprising providing a protective layer over the resistive heating layer.

14. The method of claim 13 wherein the protective layer comprises one or more of a moisture barrier, a ground plane and a thermal barrier.

15. The method of claim 10 further comprising bonding the resistive heating layer to composite material and providing a decorative upper layer over the resistive heating layer and the composite material.

* * * * *